Dec. 22, 1964     K. L. BANDY ETAL     3,162,079
APPARATUS FOR CUTTING METAL STRIP INTO SHEETS
Filed Sept. 12, 1961                          4 Sheets-Sheet 3
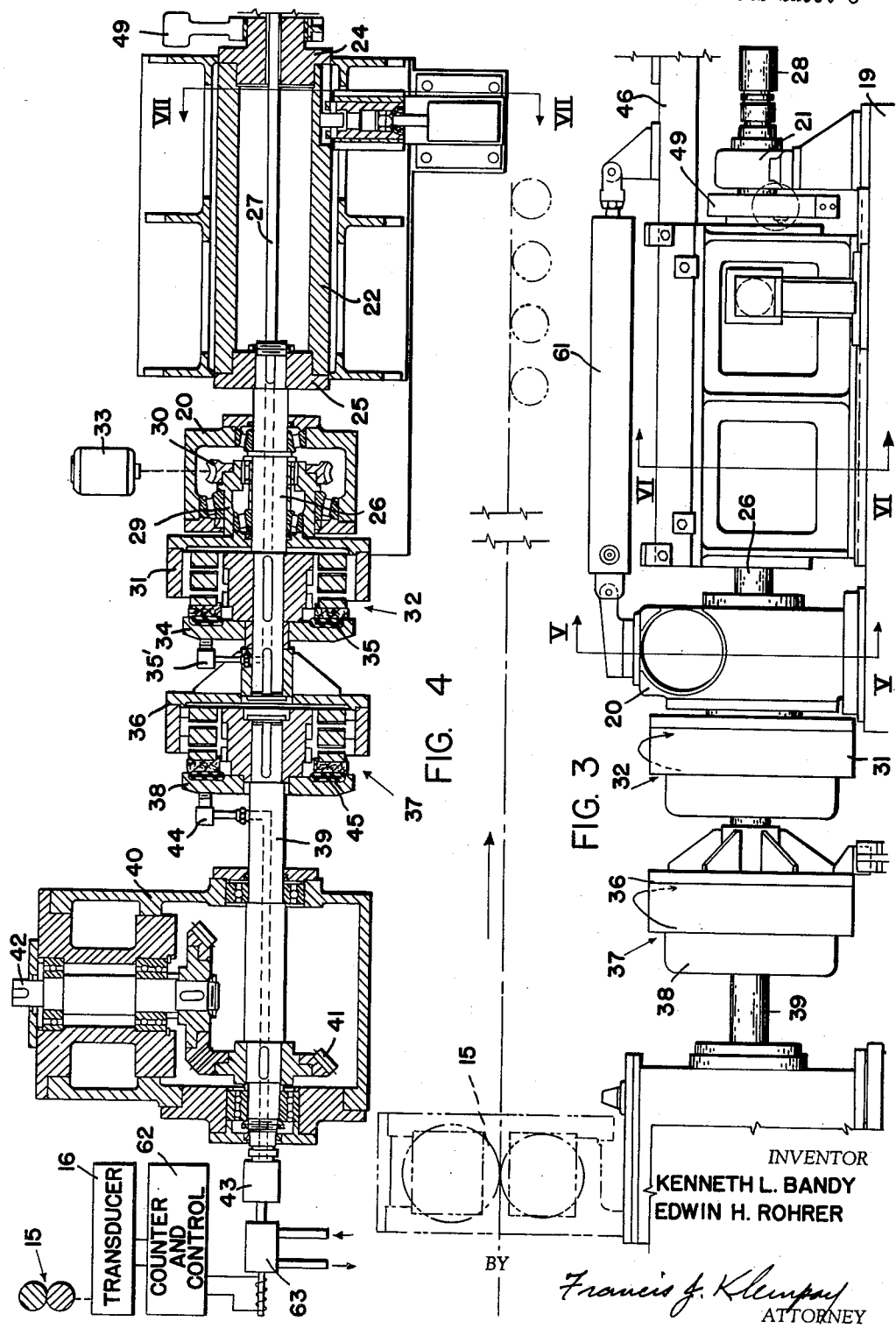
INVENTOR
KENNETH L. BANDY
EDWIN H. ROHRER
BY Francis J. Klempay
ATTORNEY Dec. 22, 1964   K. L. BANDY ETAL   3,162,079
APPARATUS FOR CUTTING METAL STRIP INTO SHEETS
Filed Sept. 12, 1961   4 Sheets-Sheet 4
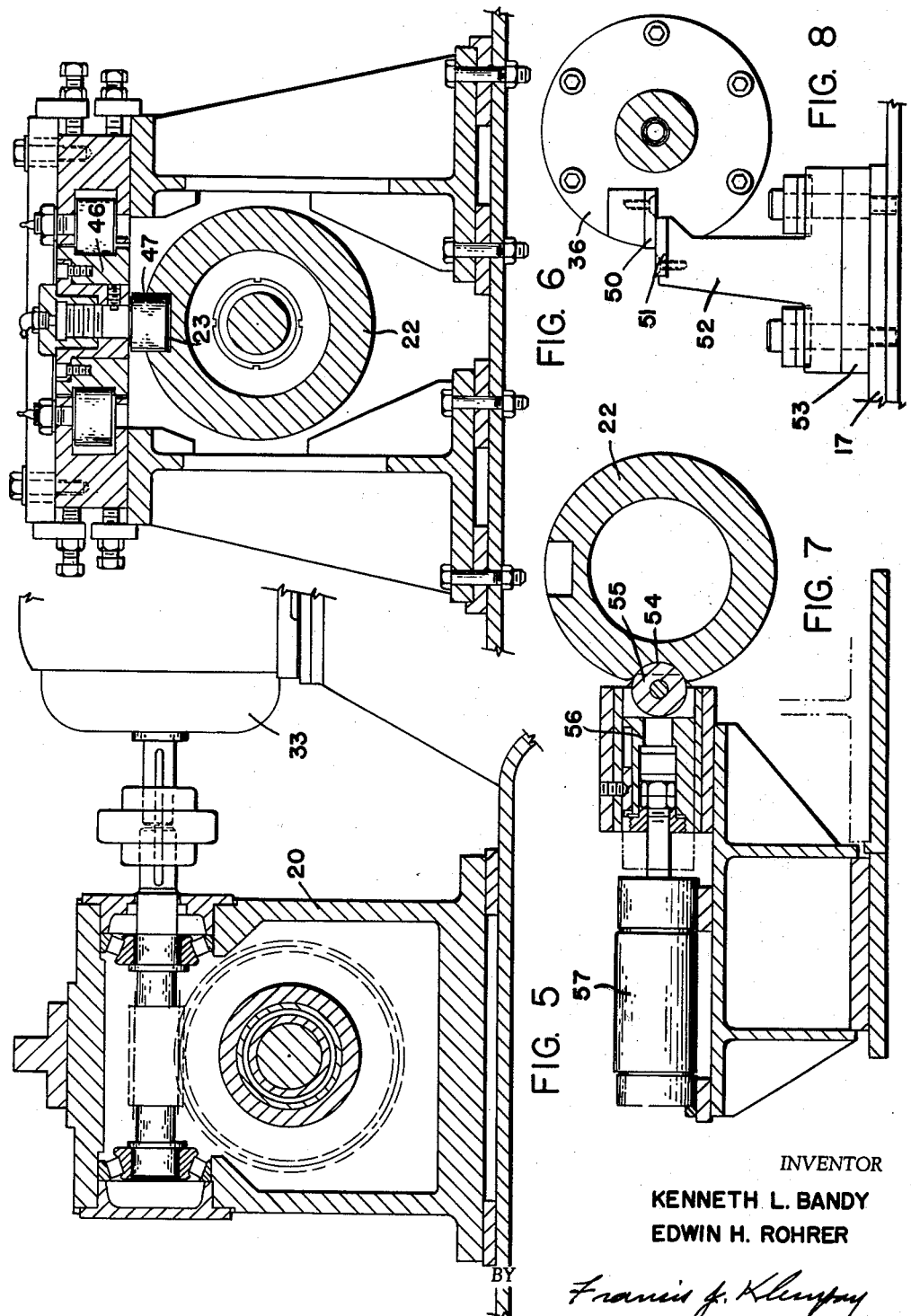
INVENTOR
KENNETH L. BANDY
EDWIN H. ROHRER
BY Francis J. Klempay
ATTORNEY United States Patent Office 3,162,079
Patented Dec. 22, 1964

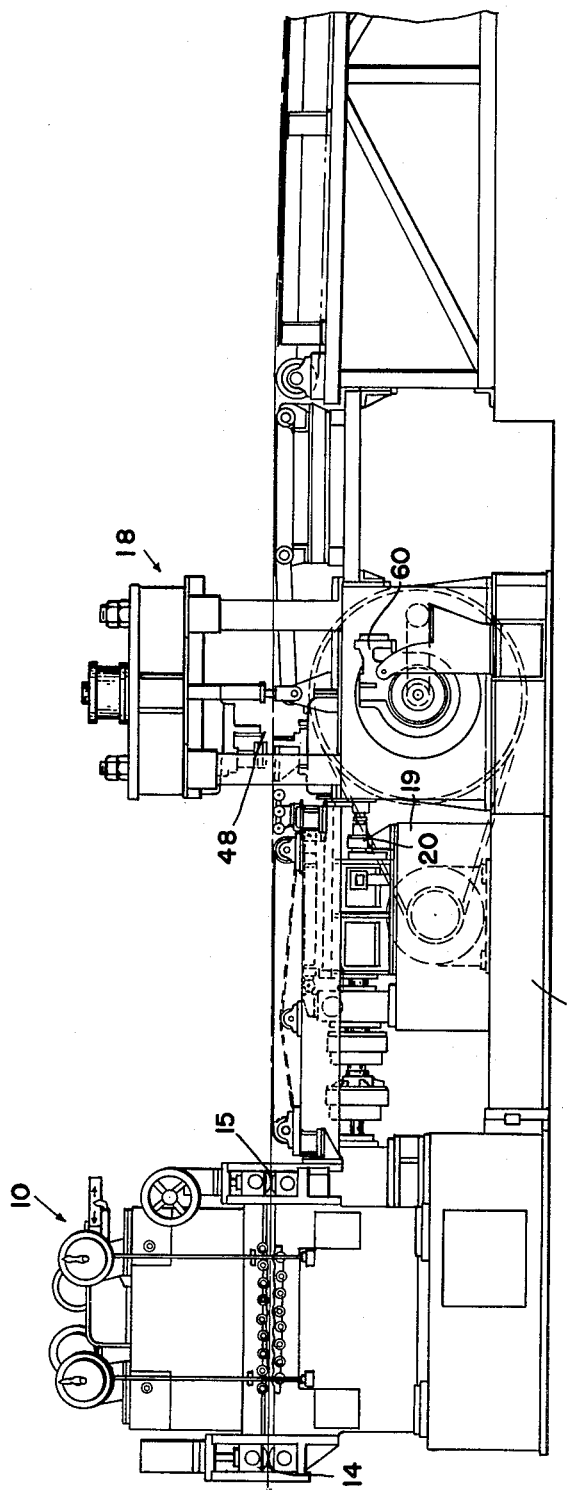

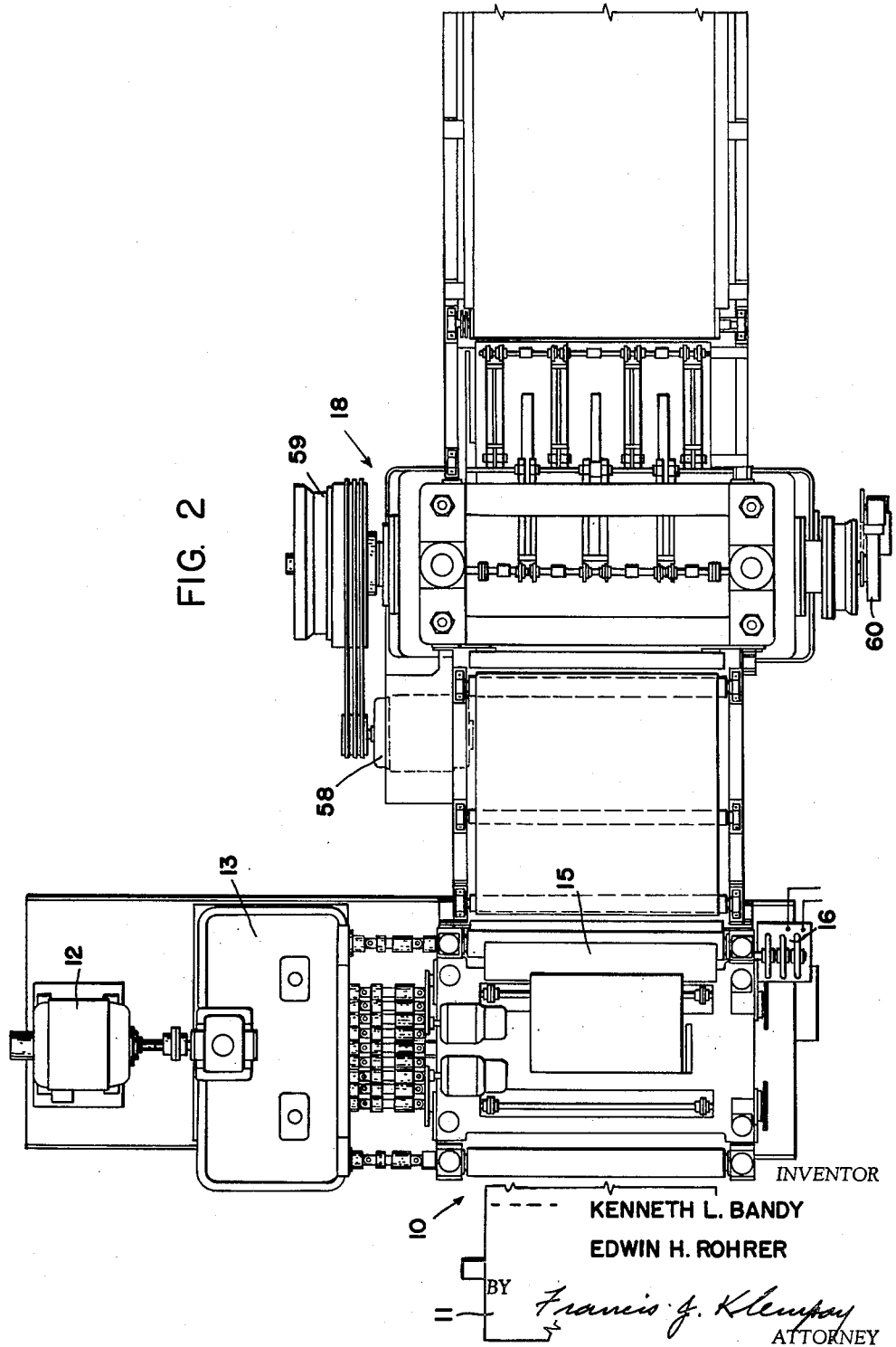

1

3,162,079
APPARATUS FOR CUTTING METAL STRIP
INTO SHEETS
Kenneth L. Bandy, Canfield, and Edwin H. Rohrer, Poland, Ohio, assignors to The McKay Machine Company, Youngstown, Ohio, a corporation of Ohio
Filed Sept. 12, 1961, Ser. No. 137,626
5 Claims. (Cl. 83—287)

This invention relates to industrial equipment for automatically and rapidly cutting metal strip into accurately sized sheets of predetermined and/or programmed dimensions, and the present application is a continuation-in-part of application Serial No. 809,428, filed April 28, 1959, by Kenneth L. Bandy, one of the applicants herein, and now abandoned.

The primary object of the invention is the provision of apparatus of rugged industrial mill quality which is operative to rapidly and automatically cut metal strip as received in large coils into sheets of close tolerances as to dimensions which may be automatically predetermined and/or programmed. In sheet metal fabricating as well as in warehousing activities, it is most economical and desirable to receive and store the flat metal stock in coil form and to cut off sheets therefrom as needed. Orders to the cut-up line or lines are usually varied and utilization processes and/or shipping schedules may require the rapid production of sheets in a predetermined order as to sizes. It is accordingly desirable to program the production on tape or cards, for example, and the apparatus of the present invention is intended to fulfill the need for rugged, dependable, and accurate apparatus capable of being so automatically controlled and capable of being operated at a high rate of speed.

We utilize the chracteristics of a precision roller leveler not only to render the coiled stock absolutely flat but also to advance the stock at a uniform controlled speed whereby it can be accurately measured. Secondly, we provide a clutch-controlled mechanical transmission driven directly from the leveler for rapidly accelerating the shearing or cut-off die into exact synchronous speed with the moving strip. By mechanically coupling the multiple work rolls of the leveler with the die moving means, accurately measuring the strip, and initiating actuation of the clutch at precisely the right times in the operating cycles—i.e. immediately after the passage of predetermined lengths of strip—close tolerances in the lengths of the sheets produced may be obtained.

Another object of the invention is the provision of improved apparatus for returning the shearing die set and motion transmitting and/or generating elements connected thereto back to their starting positions at the completion of a cut-off cycle. In accordance with this invention this apparatus includes rugged quick-acting power means for returning the die set and connected elements at high speed as well as decelerating, stop and positioning or aligning means which is operative to quickly force the elements and die into their precise starting positions.

The above various improvements in the apparatus for moving the shearing die back and forth during each cycle of operation are important from a practical standpoint in a cut-off line which is automatically programmed since

2 it will be readily apparent that if the roller leveler and strip are running at fairly high speeds as is normally desired when producing long sheets, the die must nevertheless be returned very rapidly to be in proper position to pick up a short sheet if the programer should suddenly call for the production of the same. In any flying shear apparatus, the rate of production is limited by the ability of the apparatus to rapidly accelerate the die into synchronous movement of the stock, to accurately relate the die longitudinally with respect to the stock, and to quickly return the die back to its initial starting position in each cycle of operation. The apparatus we propose herein achieves all of this in a rugged, dependable manner. The driving clutches used are of a type and have sufficient over-capacity that the slippage incurred in reaching synchronous speed for the die is uniform and predictable, allowing accurate correction therefor to be made in the measure-responsive control used to initiate the cut-off cycles. Preferably, this control is of the electronic pulse-counting type which lends itself well to tape and card programming as well as to other modern species of remote or automatic control.

The above and other objects and advantages of the invention will become apparent upon consideration of the following specification and the accompanying drawing wherein there is disclosed a preferred embodiment of the invention.

In the drawing:

FIGURE 1 is a side elevation of assembled apparatus constructed in accordance with the principles of our invention;

FIGURE 2 is a plan view of the apparatus of FIGURE 1;

FIGURE 3 is a side elevation, on an enlarged scale of a portion of the apparatus of FIGURES 1 and 2;

FIGURE 4 is a horizontal section through the apparatus of FIGURE 3;

FIGURES 5 and 6 are vertical sections taken along the lines V—V and VI—VI, respectively, of FIGURE 3;

FIGURE 7 is a fragmentary end view taken substantially from the vertical plane which includes the line VII—VII of FIGURE 4; and FIGURE 8 is an elevational view, of a detail of the assembly of FIGURE 3.

Close tolerances in the lengths of the sheets cut from the strip is dependent on a number of factors among which are the flatness of the strip as it enters the shear and the precise synchronization of the shear with the moving strip. Once these characteristics are consistently obtained, it is only necessary to accurately measure the length of the strip being fed and to so time the acceleration of the shear in relation to such length measurements that the shear will reach synchronous speed with the strip at a precise location on the strip and thus be prepared to sever an accurately measured sheet from the strip.

To accomplish the above, we provide strip feeding means in the form of a roller leveler, indicated generally by the reference numeral 10, which is adapted to take strip directly from a coil 11 and to advance the same continusuoly and longitudinally to the shear. Roller leveler 10 may be of more or less conventional design having a drive motor 12 acting through a distributive power transmission 13 for driving the entry pinch rolls 14, the work rolls, and one of the exit pair of pinch rolls 15. The diameters of the pinch and work rolls and the gear ratios in the transmission 13 are so related that the various rolls have only rolling contact with the strip and the peripheral speed of the idling one of the pair of pinch rolls 15 is exactly equal to the linear feed of the strip. By accurately maintaining the diameter of this idling exit pinch roll the length of strip feed may be very accurately measured by measuring the extent of rotation of this roll. Thus, a transducer 16 may be driven from this idler roll to generate an electrical impulse for each minute fraction of a revolution of the roll, which impulses are electronically counted by conventional apparatus, not a part of our invention, and used to initiate actuation of a shear accelerating mechanism now to be described.

Rigidly coupled to the base of the leveler 10 is a base 17 mounting a down-stroke press 18 in spaced relation to the exit pinch rolls 15. Base 17 has a pedestal portion 19 intermediate the leveler and press on which is mounted in spaced relation a worm gear reducer 20 and a pillow block 21. Journaled in these members is a drum-type of cam 22 which is formed of a thick-walled length of tubing and which has machined in its outer periphery a spiral groove 23. For so journalling the cam 22 in the block 21 there is provided an end cap 24 having an integral shaft fitting within block 21 and also having a centrally disposed longitudinal thru-bore. Closing off the other end of the cam 22 is a heavy end wall 25 from which extends a heavy hollow shaft 26 journaled in the anti-friction bearings of the reducer 20. A tube 27 is connected in fluid-tight relation to the inner end of shaft 26 and extends outwardly through the end cap 24 and has a fluid-pressure supply fitting 28 swivelled on its outer free end.

It should be observed at this point that the gear reducer 20 has a sleeve 29 which rotates concentrically about the shaft 26 and which mounts the worm wheel 30 of the reducer. Rigidly connected to and carried by this sleeve 29 is the driver element 31 of an air-operated clutch, indicated generally by the reference numeral 32, and the member 31 may be considered as a flywheel since the same is continusuoly driven by a motor 33 which remains energized during operation of the combined apparatus. Keyed onto the shaft 26 is the driven element 34 of the clutch 32 which mounts the expansible air chamber 35 of the clutch, and this chamber is arranged to receive air under pressure from the bore within shaft 26 through fitting 35'.

Also rigidly keyed onto the shaft 26 is the driven element 36 of a second air-operated clutch 37 the driving element 38 of which is keyed onto a shaft 39 precisely aligned with shaft 26 and journaled in a housing 40 containing a set of bevel gears 41. The latter has an input shaft 42 which is coupled to and driven by the distributive power transmission 13 so that the driving element 38 of the clutch 37 rotates continuously and synchronously with the pinch and work rolls of the roller leveler above mentioned. Since the element 38 is so continuously and uniformly rotated, it may be considered as a flywheel. Shaft 39 is hollow so that air pressure may be conducted from a rotary fitting 43 through a fitting 44 mounted on shaft 39 to the expansible chamber 45 of the clutch 37. As shown, the chamber 45 is carried by the driving element 38.

Slideably mounted on a suitable anti-friction track which extends parallel with and below the path of strip travel is a driving member 46 which carries the cam following roll 47 received in groove 23 and which is rigidly coupled to a cut-off die set 48 supported on the fixed bed of the press 18. While not particularly shown, this die set, which is of known construction, includes upper and lower blade-carrying platens interconnected with vertically extending guide pins. This die set is mounted in suitable anti-friction ways in the press 18, and when the upper vertically movable platen of this press moves down and up during a cycle of operation the upper platen of the die set will have corresponding movement to close and then open the shear blades to first effect a transverse cut in the moving strip and to thereafter allow passage of the strip while the die set or shear is being returned back to its initial starting position. Driver 38 of clutch 37 rotates in proper direction to accelerate the die set 48 into synchronous movement with the strip but driver 31 of clutch 32 rotates in the opposite direction to retract the die set when this clutch 32 is actuated.

Clutches 32 and 37 are readily available in the open market and when furnished with consistently uniformed pressures under consistently uniform rates of build-up are remarkably consistent in their operation—i.e. the extent of slippage which takes place before the driven element catches up with the driver will be consistently uniform, enabling the proper correction for this lag to be made in the pulse counting and control circuit of the assembled apparatus. The lead of the spiral cam groove 23 is such that when the cam drum 22 has rotated a predetermined number of degrees and reaches synchronous rotation with the shaft 39 the die set 48 will move at exactly the speed of the strip, and the distance of this synchronous movement is appreciable to provide ample time for the actuation of the shear or die set 48 through a cycle of operation. As stated initially above, however, it is highly desirable that the rotary cam 22 begins its accelerating movement always from a predetermined rotational position, and this is provided for in the apparatus of this invention by the mechanism now to be described.

The die set is returned under high speed by the motor 33 acting through reducer 20 and clutch 32, and during such retraction the element 36 of clutch 37 rotates counter-clockwise as viewed from the right in FIGURE 3 or as viewed head-on in FIGURE 8. Of course, retracting clutch 32 is de-energized well prior to the cam 22 reaching its fully retracted position and the parts are allowed to coast back to their limiting positions under the control of an air brake 49. To provide a mechanical stop, we rigidly attach a stop plate 50 onto the element 36 for engaging a relatively fixed abutment plate 51 carried by a bracket 52. Bracket 52 is, in turn, carried by the base 17 through a pad 53 of suitable yieldable material such as rubberized fabric. A radially inward extending indentation 54 is formed in the periphery of the cam drum 22 at a location to arrive at a locating or aligning roller 55 as the stop plate 50 closely approaches the abutment plate 51. As shown in FIGURE 7, the roller 55 is carried by a slide 56 actuated by cylinder 57, and in normal practice, compressed air is admitted to the outer end of cylinder 57 as the detent 54 approaches roller 55 during retractive rotation of the cam 22. The arrangement is such that not only does the interaction of the detent and roller restrain the rebound of the plates 50 and 51 but also the large radially inward force applied by cylinder 57 rocks the cam into precise predetermined position preparatory to its next cycle of operation. The air pressure in cylinder 57 is released prior to actuation of the accelerating clutch 37 but by this time the cam 22 and parts connected thereto will have lost their kinetic energy and will remain in fixed posiiton until the clutch 37 begins its drive. In any event, the cam 22 always begins its cycle from a predetermined position so that the functioning of the length control as above explained will always be uniform in its results.

Press 18 is provided with a drive motor 58 and a flywheel clutch 59 which is also preferably air-operated. Normally, the motor 58 is continuously energized and the clutch 59 is energized under the control of a limit switch, not shown, only after the die set 48 has attained synchronous speed with the stock. In accordance with usual practice, the press 18 is also provided with an air brake 60 and with inherent control means, not shown, which causes the press to make one cycle of operation during each energization of the clutch 59'. This cycle consists of moving the upper movable platen of the press downwardly a sufficient distance to actuate the die set 48 and thence upwardly back to its initial starting position where it is stopped by the brake 60 in preparation for the next succeeding cycle of operation. Presses of the general kind illustrated at 18 are designed for very fast operation—having ample power and ruggedness while yet having a minimum of weight in the parts thereof which must be accelerated and decelerated in each cycle of operation.

To further assist the actuation and control of the movement of the die set 48 and its connected elements, we provide an air cylinder 61 anchored at one end onto the housing of gear reducer 20 and having its rod end connected to the slide 46 as shown in FIGURE 3. By the use of suitable solenoid-operated valves and control circuits, not shown, air may be emitted to opposite ends of the cylinder 61 at proper times to assist in accelerating and decelerating rotation of the drum cam 22 in opposite directions. Cylinder 61 is particularly useful in cushioning the die set and its connected elements at the ends of its working and retracting strokes, although it should be understood that by properly timing the energization of the clutch 32 this clutch may also be made to act as a brake to decelerate the die set at the outer end of its working stroke.

The length of each sheet cut off the strip is controlled by energizing the clutch 37 at a time when the leading end of the strip has reached a predetermined position relative to fixed portions of the apparatus. A determination of the position of the leading end of the strip and provision for varying the control point of said position may be provided by an electronic counter and control 62 shown schematically in FIGURE 4. The control 62 receives electrical pulses generated by transducer 16 in accordance with rotation of the strip measuring rolls 15 and, as stated above, the presetting register of the control 62 may be either manual, tape, card, or remotely controlled to direct the lengths of the sheets being cut off the strip. The operation of the assembled apparatus is such that upon the leading end of the strip reaching the desired control point an output circuit from control 62 is energized to operate a valve 63 and admit air to the clutch 37 through rotary fitting 43 and the hollow shaft 39. Of course, suitable interlocking circuits, not shown, are provided to de-energize valve 63 at the end of the working stroke of the shearing die 48 and generally to sequence the operation of the whole apparatus in the manner herein described.

It should now be apparent that we have provided apparatus for rapidly cutting continuously fed strip into sheets of accurate but variable lengths which accomplishes the objects initially set out. By mechanically driving the die accelerating and moving mechanism directly from the drive for the roller leveler or other device used to positively feed the strip in a forward direction, synchronous movement of the die and strip is assured under all conditions, and so long as the strip is accurately measured and the slippage required to accelerate the die is uniformly consistent, accurately controlled lengths or sheets may be produced. By providing a powerful closely coupled and independently powered means to rapidly retract the die set and its connected accelerating mechanism and by providing an adequate protective cushioning for these reciprocating parts, the assembly may be very quickly recycled. It should be appreciated that this enables short lengths to be rapidly cut from the strip, and such lengths will be accurate because of the provisions herein made for rapidly and positively moving the accelerating cam into its proper starting position.

An examination of the assembled structure shown in FIGURE 4 will show that the forward and reverse drives for the die moving cam 22 are rugged in nature and closely coupled to the cam to eliminate all backlash. As a result, the cam rotates smoothly and with precision under a great amount of power so that although the inertia forces resulting from the mass and reciprocation of the die and other parts are very substantial, the mechanism is capable of containing them without loosening or deformation of any of the parts, and in actual practice the apparatus has proven itself able to withstand severe conditions of service over long periods of time.

It should be obvious that some changes may be made in the arrangement, components, and details of the specific embodiment herein illustrated and described without departing from the spirit or scope of the invention, and reference should accordingly be had to the appended claims in determining the scope of the invention.

We claim:

1. Apparatus for producing metal sheets from strip comprising means to advance said strip longitudinally and continuously and to measure the length of strip advanced, a power source for said means to advance, a flying shear at the exit end of said means to advance and measure operative to receive said strip and cut the same into sheets, means to accelerate the cutting blades of said shear to a speed synchronous with the movement of the strip comprising a driving member movable parallel with said strip for a predetermined distance, power transmission means comprising a remotely controlled air-actuated friction clutch for connecting said power source to said driving member and operative to effect synchronous movement of said blades and strip over a substantial portion of said distance, means controlled by said measuring means to actuate said clutch, means operative during said synchronous movement to effect relative movement of said shear blades through a shearing and opening cycle, means to disconnect said clutch and to retract said driving member and shear upon completion of said cycle, said means to accelerate comprising a drum-type rotary cam and said driving member comprising a cam follower for said cam, said power transmission means comprising a flywheel driven continuously from said power source and said clutch being adapted to drivingly interconnect said flywheel and rotary cam; said means to retract said driving member and shear comprising a second continuously driven flywheel and a second remotely-controlled air-operated friction clutch for drivingly interconnecting said second flywheel and said rotary cam for driving said cam in a reverse direction, and said rotary cam having a spiral groove engaged by said follower whereby rotation of said cam in opposite directions results in opposite directions of linear movement of said follower.

2. Apparatus according to claim 1 further including a resilient stop to limit rotation of said cam in reverse direction, said cam having a radially inward extending detent, and an aligning element adapted to be forceably injected into said detent upon the cam reaching said stop to retain said cam in a precisely predetermined rotational position preparatory to the next succeeding actuation of the first mentioned clutch.

3. Apparatus for cutting continuously moving strip into predetermined lengths comprising power means to move the strip and means to measure the length of strip advanced by said power means, a flying shear, means to accelerate said shear into synchronous movement with the strip comprising a drum-type cam journaled for rotation about an axis generally parallel with the path of movement of said strip and having a clutch element mounted on one end thereof, a flywheel constituting a second clutch element continuously connected to said power means and journaled for rotation about said axis, a follower for said cam connected to said shear, means controlled by said measuring means and comprising an air-actuated friction device for drivingly interconnecting said clutch elements, and means to de-energize said interconnecting means and to return said cam to its initial starting position after completion of a shearing cycle.

4. Apparatus according to claim 3 further characterized in that said means to return comprises a second continuously rotating flywheel journaled on said axis and rotating in opposite direction from the first mentioned flywheel, and a remotely controlled air-actuated friction clutch for interconnecting said second flywheel with said cam.

5. Apparatus according to claim 3 further characterized in that said drum is formed with a radially inward extending detent, and an aligning element adapted to be forceably injected into said detent upon the cam being returned substantially to its initial starting position to retain said cam in a precisely predetermined rotational position preparatory to the next succeeding actuation of said interconnecting means.

References Cited in the file of this patent
UNITED STATES PATENTS

| | | |
|---|---|---|
| 1,965,620 | Vogt | July 10, 1934 |
| 2,019,465 | Rubin | Oct. 29, 1935 |
| 2,326,978 | Sieg | Aug. 17, 1943 |